(12) United States Patent
Krug

(10) Patent No.: US 9,420,629 B2
(45) Date of Patent: Aug. 16, 2016

(54) HIGH BANDWIDTH OPEN WIRED NETWORK

(71) Applicant: The Boeing Company, Chicago, IL (US)

(72) Inventor: William P. Krug, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 42 days.

(21) Appl. No.: 13/959,477

(22) Filed: Aug. 5, 2013

(65) Prior Publication Data

US 2014/0056292 A1    Feb. 27, 2014

Related U.S. Application Data

(63) Continuation of application No. 10/745,258, filed on Dec. 22, 2003, now abandoned.

(60) Provisional application No. 60/472,575, filed on May 21, 2003.

(51) Int. Cl.
| | |
|---|---|
| *H04W 4/00* | (2009.01) |
| *H04W 84/12* | (2009.01) |
| *H04W 84/00* | (2009.01) |
| *H04W 84/06* | (2009.01) |
| *H04W 84/18* | (2009.01) |

(52) U.S. Cl.
CPC .............. *H04W 84/12* (2013.01); *H04W 84/00* (2013.01); *H04W 84/06* (2013.01); *H04W 84/18* (2013.01)

(58) Field of Classification Search
CPC ..... H04W 84/12; H04W 84/00; H04W 84/06; H04W 84/18

USPC .............................. 455/431; 370/338, 395.53
See application file for complete search history.

(56) References Cited

U.S. PATENT DOCUMENTS

| | | | | |
|---|---|---|---|---|
| 5,394,402 | A  * | 2/1995 | Ross | 370/402 |
| 6,757,712 | B1 * | 6/2004 | Bastian et al. | 709/206 |
| 6,914,905 | B1 * | 7/2005 | Yip et al. | 370/395.53 |

(Continued)

OTHER PUBLICATIONS

Kahn, Richard and Manfredi, Albert. Evolution of the Fiber Optic Data Multiplex System 1973-2010, Presented at 13th International Ship Control Systems Symposium, Apr. 7-9, 2003, 10 pages.

(Continued)

*Primary Examiner* — Nay A Maung
*Assistant Examiner* — Angelica M Perez
(74) *Attorney, Agent, or Firm* — Patterson + Sheridan, LLP

(57) ABSTRACT

An open network suitable for a mobile platform that contains a plurality of host and peripheral devices. Within the network, a central server communicates with at least one switch. In turn, a plurality of network devices communicate with the switch. In turn, a plurality of host devices connect to network devices. Thus, each of the plurality of peripheral devices communicates with one of the host devices. Moreover, the mobile platform may be an aircraft including a control panel to control the network. Additionally, a CoreNet and the in flight entertainment and cabin services subsystem may be in communication with the network. Additionally, the network may include a satellite transceiver/data router. In one embodiment, the peripherals use Bluetooth protocol devices to communicate with host devices on a virtual local area network within the network. The virtual network controls the security and quality of service of the network that interconnects the host, and other, devices.

22 Claims, 9 Drawing Sheets

(56) References Cited

U.S. PATENT DOCUMENTS

| | | | | |
|---|---|---|---|---|
| 6,980,549 | B1* | 12/2005 | Shabtay | H04L 12/4641 |
| | | | | 370/392 |
| 7,020,708 | B2* | 3/2006 | Nelson et al. | 709/230 |
| 7,213,055 | B1* | 5/2007 | Kathol | 709/217 |
| 2002/0010633 | A1* | 1/2002 | Brotherston | 705/26 |
| 2002/0160773 | A1* | 10/2002 | Gresham et al. | 455/431 |
| 2003/0045231 | A1* | 3/2003 | Chapelle | H04B 7/18508 |
| | | | | 455/12.1 |
| 2003/0053442 | A1* | 3/2003 | Purpura | H04M 7/006 |
| | | | | 370/352 |

OTHER PUBLICATIONS

Krug Ph.D., William P. "Opto-NW Aeropace II", Communication Technology for Aircraft Cabin Applications, Bellevue, WA, Nov. 1, 1999, 32 pages.

Krug Ph.D, William P. Digital Avionics Systems Conference, Communication Technology for Aircraft Cabin Applications, Bellevue, WA, Nov. 5, 1998, 36 pages.

Krug Ph.D.,William P. "Open Wired Network: 3GCN Proposal", dated Oct. 2002; 15 pages.

World Airline Entertainment Association, Next Generation Wired Working Group: "3GCN Specification, Draft 2.0", dated Feb. 1, 2002, 46 pages.

World Airline Entertainment Association, Next Generation Wired Working Group: "3GCN Requirements, Revision New", dated Feb. 1, 2002, 46 pages.

Shetty Ph.D., Sudhakar: "3rd Generation Cabin Network Standards", dated Oct. 14, 2002, 19 pages.

World Airline Entertainment Association Technical Committee. "IFE Dataloaders: Draft Version 1.0", dated Jul. 23, 2003, 17 pages.

Childers, Michael: "Digital Content Delivery System for In-Flight Entertainment", dated Jul. 15, 2003, 8 pages.

Stawman. "Digital Media Server for Overhead Video Distribution Marketing Requirements", dated Apr. 24, 2003, 4 pages.

Olson, Earle: "Fiber Optics: Technical Overview", dated Jul. 23, 2003, 20 pages.

Guckian, Paul. "Aircraft Cabin Wireless Telecommunications Network: System Design; Challenges", dated Nov. 11-12, 2003, 46 pages.

Kirkland, David T. "Connexion by Boeing: Wireless Lan", dated Nov. 10, 2002, 17 pages.

Nelson, John. "Securing IFE Digital Content DCMWG", dated Jul. 23, 2003, 11 pages.

World Airline Entertainment Association. "3rd Generation Cabin Network (3GCN); Guideline", dated Apr. 21, 2003, 53 pages.

Shelly, Dr. Sudhakar. "3GCN Guideline Summary for Adoption Recommendation", dated Apr. 30, 2003, 17 pages.

TEAC. "Digital Video Security Overview", dated Mar. 20, 2003, 11 pages.

Kuriger, Glenn. "Center for the Study of Wireless Electromagnetic Compatibility", dated Jul. 20, 2002; 43 pages.

World Airline Entertainment Association. "3rd Generation Cabin Network (3GCN): ADN, SDN, ODN, PDN Status"; dated Jul. 30, 2002; 29 pages.

Cutbirth, Steve. "Personal Cell Phone Use Inflight", dated Jul. 30, 2002; 36 pages.

World Airline Entertainment Association Technical Committee. "Security Topics", dated May 13-14, 2002, 8 pages.

Shelly, Dr. Sudhakar. "3GCN Standard: 3rd Generation Cabin Network—Wired", dated May 13, 2002, 34 pages.

Garcia, Kathy. "Ethernet Technology for the 3GCN Standard", dated Feb. 7, 2002; 19 pages.

Mary. "Passenger and Airline Expectations", dated Nov. 19, 2002, 55 pages.

Lewalter, Peter. "Wireless Reality", dated Nov. 19, 2002, 37 pages.

St. John, Ed. "Operational Issues Wireless Overview", dated Nov. 19, 2002, 45 pages.

Unknown Author. "3GCN Focus Group Report—030703", dated Mar. 7, 2003, 9 pages.

ARINC. "ARINC Specification 664 Part 5: Security", dated Mar. 6, 2003, 20 pages.

Unknown Author. "3GCN Power Distribution Proposal", dated Mar. 7, 2003, 1 page.

Monitor Group and Zone Reactor. "WAEA Next Generation Wired Networks FOBWDM Proposal", dated Oct. 1, 2002, 43 pages.

Unknown Author. "Thales Avionics In-Flight Systems: Suggested Directions", dated Oct. 2002, 5 pages.

Digital Prizzm. "Content Management Solution", dated 2002; 10 pages.

\* cited by examiner

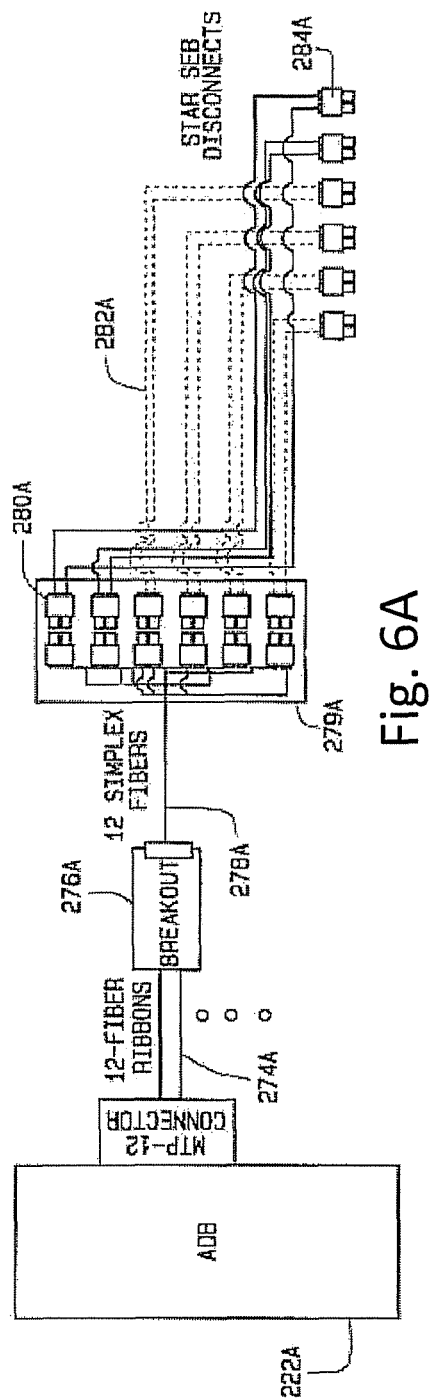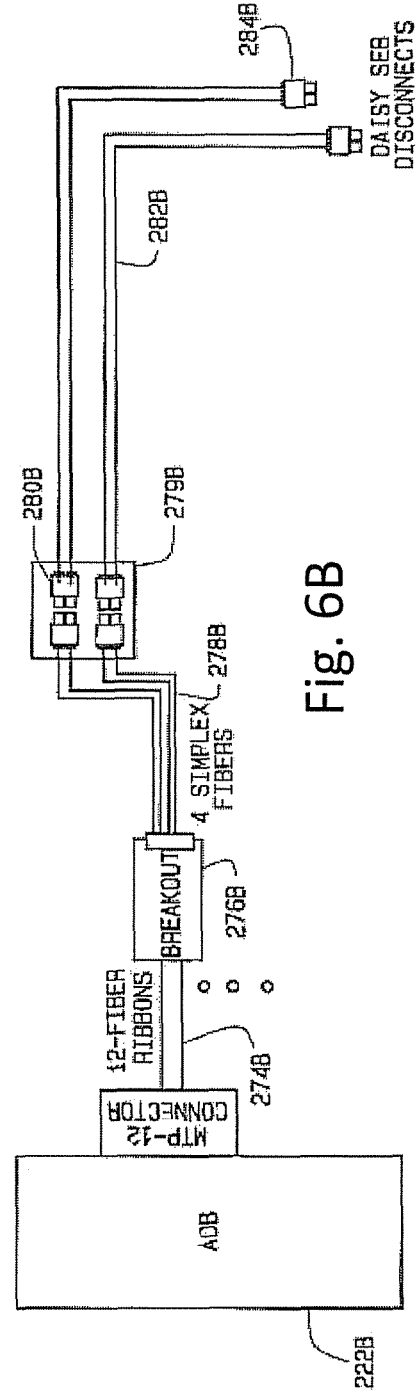

HIGH BANDWIDTH OPEN WIRED NETWORK

CROSS-REFERENCE TO RELATED APPLICATIONS

This application is a continuation of U.S. application Ser. No. 10/745,258, filed Dec. 22, 2003, which claims priority from U.S. Provisional Patent Application No. 60/472,575, filed May 21, 2003. This application is also generally related to PCT International Application No. PCT/US04/16037, filed May 20, 2004, which is a continuation of U.S. application Ser. No. 10/745,258, filed Dec. 22, 2003, which claims priority from U.S. Provisional Application 60/472,575, filed May 21, 2003. The entire disclosures of each of the above applications are incorporated herein by reference.

FIELD OF THE INVENTION

The present invention relates to communication systems on mobile platforms, and more particularly to open, local area networks that incorporate in route entertainment, cabin services, and satellite Internet subsystems onboard the mobile platforms.

BACKGROUND OF THE INVENTION

Commercial aircraft in widespread use today, include numerous cabin systems for the benefit and convenience of the passengers. These systems, for example, include the In Flight Entertainment (IFE) and Cabin Services Systems (CSS). The suppliers of these individual systems typically design their systems in isolation from each other. Accordingly, while the weight, power consumption, and capabilities of each system might be optimized, the previously developed systems neglect to address aircraft-level weight, power, and other important factors associated with these systems. Thus, there remains a need to optimize the cabin systems with respect to the aircraft as a whole.

In particular, the previously developed systems tend to use heavy, costly co-axial, twin-axial or quad copper cables to connect the various devices within the individual systems. Moreover, these types of cables tend to be difficult to install because of the bulky and difficult to terminate connectors that they require. Worse still, these cable types are bandwidth limited due to aircraft cabin electrical shielding requirements. Furthermore, since current In-Flight-Entertainment systems share the distribution media (i.e., the cabling) and divide the available, limited bandwidth among the passengers, the previously developed systems suffer from limited security and scalability.

Meanwhile, with the widespread availability of consumer electronics, aircraft passengers have begun bringing network compatible devices (e.g., laptop computers and personal digital devices) onboard aircraft to entertain themselves during their flights. Unfortunately, for the passenger, conventional IFE systems are generally incompatible with these information technology compatible devices. Thus, the convergent entertainment technologies becoming available on the Internet (e.g., multimedia information and multi-player Internet games) remain effectively out of reach of aircraft passengers.

Thus, the prior art systems fail to support the convergent services that are increasingly sought by aircraft passengers.

SUMMARY OF THE INVENTION

The present invention includes systems and methods for providing mobile platform passengers with broadband connectivity to support: rebroadcast television, audio, messaging, playback of stored video, the crew information system, the electronic flight bag, applications, voice, cell phone, video on demand, audio on demand, and online games, among other multimedia, Internet, and telecommunication technologies. In general, the open network, and associated methods, provided herein replace the previous technology that included many parallel systems thereby creating weight, power, and space savings. Moreover, the present invention provides for more convenient network upgrades, maintenance, modifications, and additions. Additionally, the present invention provides connectivity for a broad range of peripherals and supports "plug and play" applications and peripherals for use onboard a mobile platform.

More particularly, the present invention allows passengers on an aircraft access to data servers (e.g., audio/visual on demand) while preventing unauthorized access to the data of other passengers and the data servers themselves. The passenger interface to the system, in one preferred form, is through a combination of switches and host clients that provide the passengers robust audio, voice and control via, for example, USB connections.

Briefly, the switched, high bandwidth, aircraft cabin networks provided by the present invention change the paradigm for cabin distribution systems from closed, proprietary, inflexible systems to that of an open, industry compatible, flexible, and integrated system. Methods and systems in accordance with the principles of the present invention seamlessly support both wired and wireless networks and easily adapt to a wide variety of consumer electronic and information technology peripherals. Accordingly, the present invention lowers overall aircraft cost as compared to the conventional approach of designing custom hardware and software for the various airborne applications.

Moreover, the present invention allows users seamless connectivity to broadband, air-to-ground communications systems. An exemplary broadband air-to-ground communications system is described in U.S. patent application Ser. No. 09/639,912 entitled "Method and Apparatus for Providing Bi-Directional Data Services and Live Television Programming to Mobile Platforms" filed Aug. 16, 2000, the contents of which are incorporated herein as if set forth in full.

In a preferred embodiment, the present invention provides an open network suitable for a mobile platform that contains a plurality of peripheral devices. Within the network, a central server communicates with at least one switch. In turn, a plurality of network devices communicates with the switch. Thus, each of the plurality of host and personal peripheral devices communicates with one of the network devices. Moreover, the mobile platform may be an aircraft including a control panel to control the network. Additionally, a CoreNet may provide a communication gateway between in-flight entertainment and live TV sources, cabin services subsystems, antenna subsystems, and host devices that may be in communication over the network. To extend the network to the Internet via satellite transponder/data router, the network may also include a satellite data transceiver as part of the antenna subsystem. In one embodiment, the personal peripherals could use Bluetooth compatible devices in a personal area wireless network rather than USB wired devices to interface to host user devices connected to a virtual local area network whereby the virtual network controls the security and quality of service of the network for the host user devices.

In another embodiment, the present invention provides a mobile platform that contains a plurality of host and personal peripheral devices and an open network. Within the network, a central server communicate with at least one switch. In turn, a plurality of network devices communicates with the switch. Thus, each of the plurality of peripheral host and personal devices communicates with one of the network devices. Moreover, the mobile platform may be an aircraft including a control panel to control the network. Additionally, a CoreNet may provide a communication gateway between in-flight entertainment and live TV sources, cabin services subsystems, antenna subsystems, and host devices that may be in communication over the network. To extend the network to the Internet via satellite transponder/data router, the network may include a satellite data transceiver as part of the antenna subsystem. In one embodiment, the personal peripherals (e.g., headphones, microphones, keyboards, and personal control units) could use Bluetooth compatible devices in a personal area network rather than USB wired devices to interface to host user devices connected to a virtual local area network whereby the virtual network controls the security and quality of service of the network for the host user devices.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 4 shows a star topology;

FIGS. 6A and 6B are block diagrams of various configurations for networking cabling in accordance with the principles of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
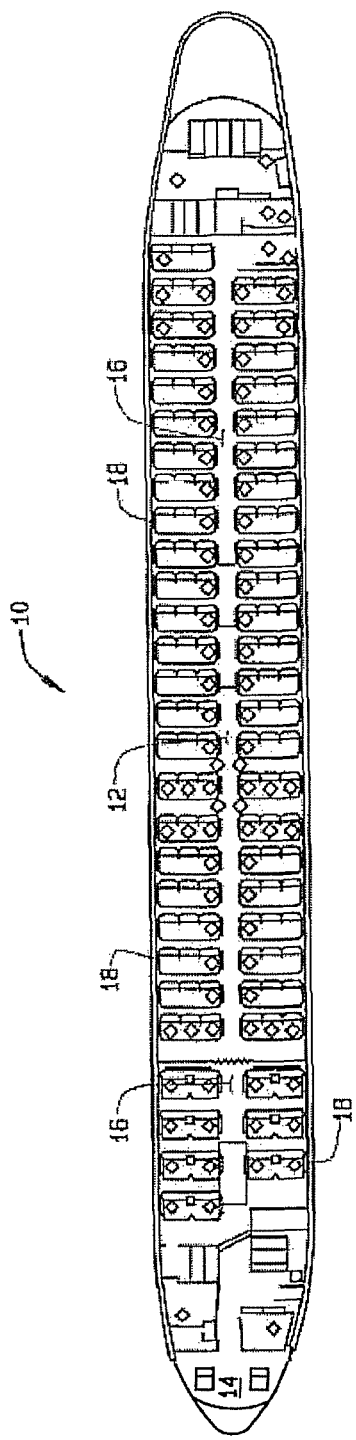
FIG. 1 is a top plan view of an aircraft in accordance with the principals of the present invention.

Turning now to the figures in general, and FIG. 1 in particular, a mobile platform 10 (e.g., aircraft) in accordance with the principles of the present invention is illustrated. Included within the aircraft 10, FIG. 1 illustrates a cabin 12 with passenger and crew sections 14 and 16, respectively. A plurality of seats 18 provides places for the passengers to relax or work during the flight of the aircraft 10. It is worth noting now that the seats 18 typically come grouped in twos or threes with a center aisle between adjacent groupings.

The aircraft 10 may include various amenities to aid the passengers in relaxing on board the aircraft. An in-flight-entertainment (IFE) subsystem may be provided to display movies and play music for the passengers. Additionally, a cabin services subsystem may be provided as discussed in co-owned, co-pending U.S. patent application Ser. No. 10/670,952, entitled Cabin Services System For A Mobile Platform, filed Sep. 25, 2003 and incorporated herein as if set forth in full.

With the widespread availability of laptop computers, personal digital assistants, Wi-Fi/cellular phones, and the like, many passengers find it convenient to work (or entertain themselves) while seated in their seat 18. Moreover, The Boeing Company is offering the Connexion By Boeing$^{SM}$ service onboard some aircraft 10 to provide Internet connectivity for the digital devices carried on board the aircraft 10 by the passengers.

Figure 2A:
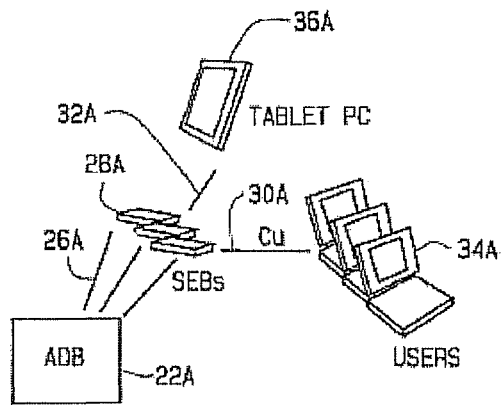
FIGS. 2A and 2B are block diagrams of a network of the aircraft of FIG. 1.

As will be appreciated, connecting all of the devices and subsystems, discussed herein, on one open network saves development time, effort, and expense for the overall aircraft 10 and over the life cycle of the various devices and subsystems. One integrated, open system also reduces overall aircraft 10 weight and energy consumption. Accordingly, FIGS. 2A and 2B illustrate preferred embodiments of such an open network 20 suitable for use on a mobile platform 10 and that reduces mobile platform 10 weight, power consumption, and development time and expense.

The open network 20 includes one or more OSI (Open Systems Interconnection) Layer three switches, herein designated as area distribution boxes (ADB) 22. These are networked together using, preferentially, fiber optic cables 24. Additional fiber optic links 26 network a plurality of seat electronics boxes (SEB) 28 to the area distribution boxes 22. The seat electronics boxes 28 generally include media converters and an OSI Layer 2 or 3 switch as will be discussed more thoroughly herein. In turn, communications paths 30 and 32 connect various digital host user devices 34 (i.e., carry-on laptops, personal digital assistants, and smartphones host user devices) and dedicated seat peripheral host devices 36, respectively, to the seat electronics boxes 28.

Additionally, a control panel 38 may be used to configure, control, and administer the network 20. In a preferred embodiment, a "CoreNet" unit 42 may be interposed between the control panel 38 and the remainder of the network 20. The CoreNet performs functions similar to those of a gateway between the crew information systems (that the control panel 38 resides in) and the remainder of the network 20 that primarily serves the crew cabin. The advantages of interposing the CoreNet unit 42 are that CoreNet units 42 manage the flow of information across the network 20. Accordingly, using the CoreNet 42 as a gateway and firewall enhances the capability to administer, monitor, and control the network 20 from the control panel 38. Of course, while FIG. 2 illustrates the CoreNet unit 42 interposed between the control panel 38 and the network 20 via copper connections 40 and 44, the present invention is not so limited. For instance, the control panel 38 and the CoreNet unit 42 may be connected in parallel to the remainder of the network 20.

Figure 2B:
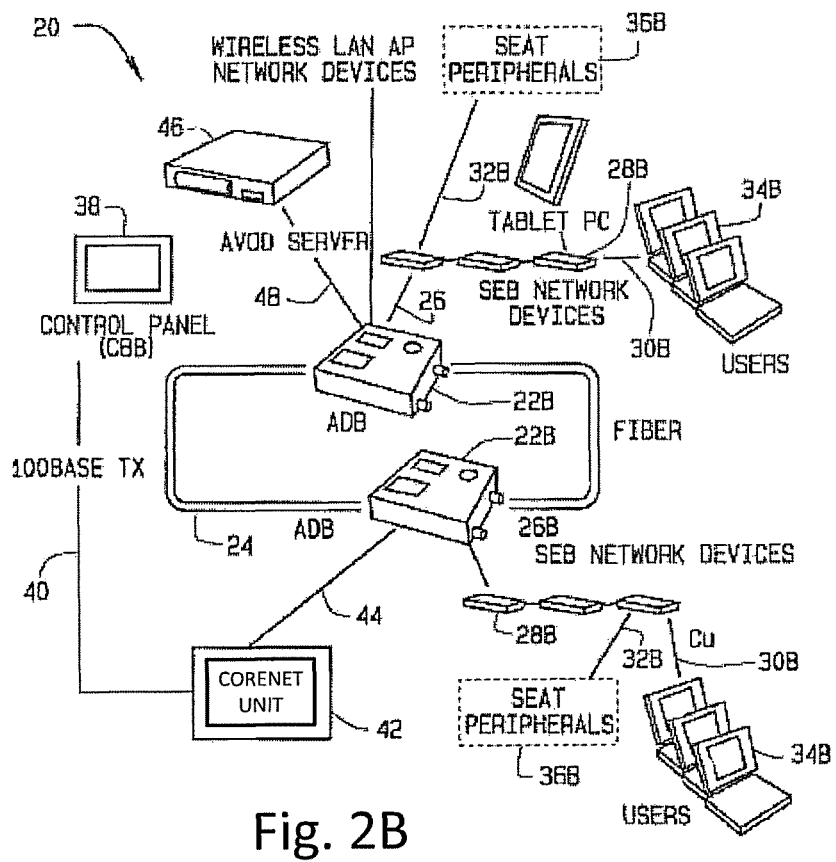

FIG. 2B also shows an audio and video on demand server 46 connected to the network 20 via fiber connection 48. In previous systems, conventional audio and video sources are decoded at a complex seat box hardwired to an appropriate seat peripheral (e.g., a headphone or a nearby television monitor) via an analog copper cable (as opposed to passed through a digital network) with the audio and video content decoded by a simple media player in a laptop or seat host peripheral. In the alternative, some previous systems connected these devices via closed, proprietary networks with complex seat boxes. Accordingly, the previous systems cannot be easily reconfigured to accommodate new functionality (i.e., new application software hosted on the server, laptop, or seat host peripheral). Nor can the previous systems be scaled to aircraft of different sizes (i.e., number of seats) since signal attenuation and noise prohibit extending the length of these closed and custom designed systems.

Worse still, each change to these conventional systems must be re-certified for each type of aircraft. Furthermore, because each of these previous systems is developed for the most independently of other components or systems (i.e., without regard for other systems), the overall aircraft 10 cannot be optimized for weight, power, use of internal space, and the like. In contrast, the present invention optimizes the overall aircraft 10 by networking these systems in an open network 20 onboard the aircraft 10.

Thus, the present invention provides an open network 20 for multiple uses. These uses include onboard Internet connectivity (e.g. the Connexion By Boeing$^{SM}$ subsystem), in flight (route) entertainment, and phone and public address handset connectivity (i.e., voice). Moreover, because of the open architecture, additional components with similar form factors may be readily added to the network 20 with little or no recertification, as was required with the previous proprietary systems. For instance, satellite television receivers/encoders, in seat displays (e.g. tablet personal computers), passenger control units, and voice-over-Internet (VOIP) headsets, handsets, and speakers may be added with relative ease while incurring little (installed hardware) or no recertification (carryon hardware) expenses or delays. Moreover, the components in this open system are functionally "plug-and-play" compatible with any client-server technology interconnected with wired and wireless LANs.

Figures 3A, 3B:
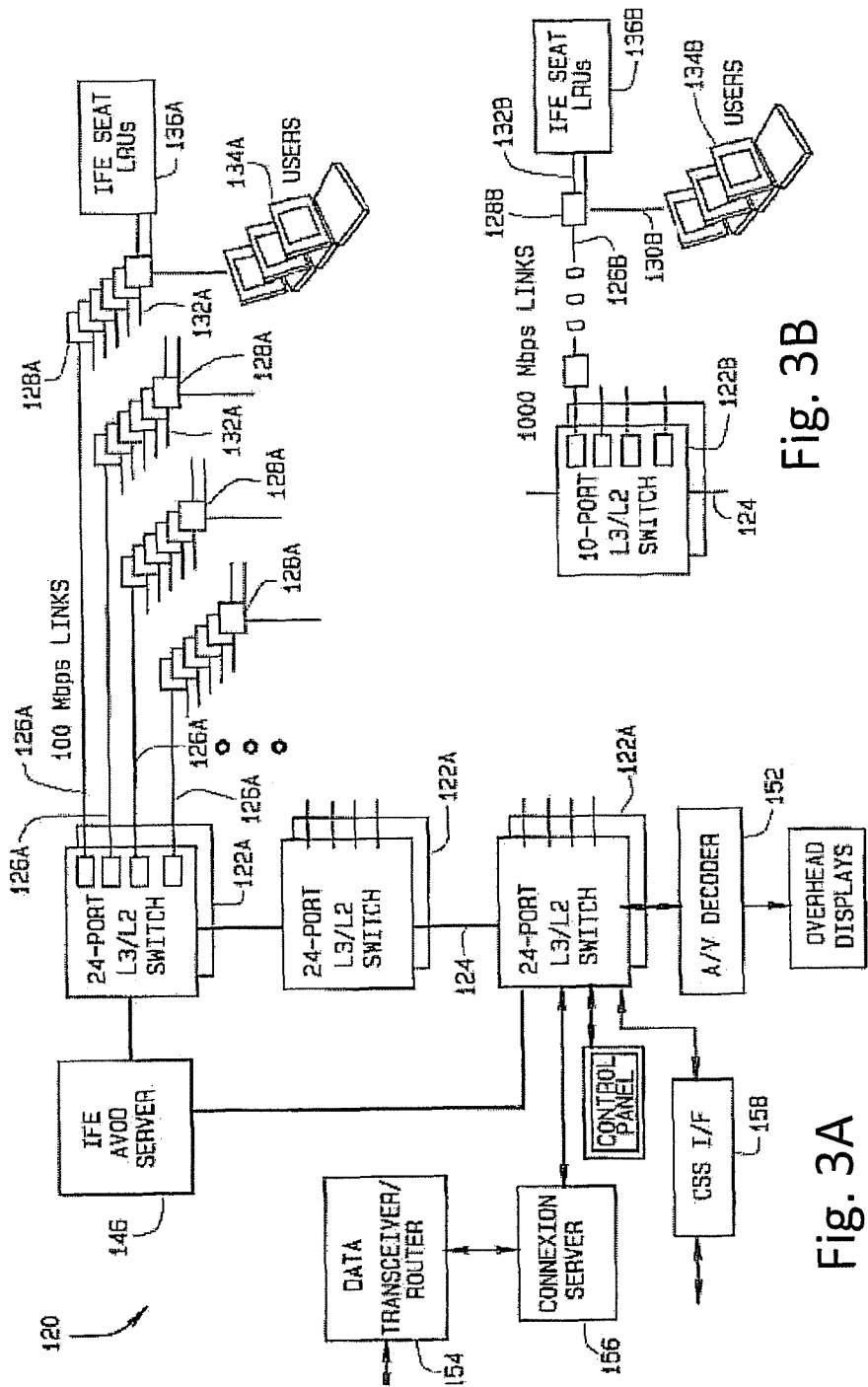
FIGS. 3A and 3B are architecture diagrams of another aircraft network in accordance with the present invention.

With reference to FIGS. 3A and 3B, additional embodiments of the present invention including an open network suitable for use on a mobile platform are illustrated. In FIG. 3B, network 120 includes several area distribution boxes 122 (switches) networked together via fiber optic cables 124. Also shown, are groups of seat electronic boxes 128 (i.e., network devices). The seat electronics boxes 128 each correspond to a seat group of one or more seats 18 of the aircraft 10 (see FIG. 1). In the present embodiment, the seat electronics boxes 128 are OSI Layer 2 switches with provisions for converting signals from the fiber optic links 126 to either copper or fiber communication paths. Notably, the present invention differs from the previous approaches in that the links 126 are fiber optic links as opposed to coaxial cables (or other copper conductors). Importantly, the fiber optic links 126 weigh about ¹⁄₁₀$^{th}$ that of the copper conductors that they replace.

Generally, the communication paths 130 will be dedicated for connection of carry-ons 134 to the network 120. Likewise, the communications paths 132 will typically be dedicated to connection of the seat peripheral hosts 136 associated with the seats 18 (e.g., overhead consoles, speakers, diskless terminals or disk-based Tablet PCs used as seatback displays, television monitors, and the like) to the network 120. While the current embodiment envisions dedicated connections for carry on and seat peripheral hosts 134 and 136, respectively, the communications paths 130 and 132 need not be so dedicated to remain within the spirit and scope of the present invention.

Additionally, FIG. 3A shows the in flight entertainment audio/visual decoder 152 for overhead displays networked with the other devices on the network 120. Likewise, the data transceiver/router 154 and Internet server 156 (e.g. Connexion By Boeing$^{SM}$) cooperate to provide Internet connectivity to the mobile platform network 120. Moreover, the cabin services subsystem may be connected to the network 120 via an appropriate interface 158 to transfer data, particularly voice data, and signals to and from the network 120 and the cabin services subsystem. Thus, the network 120 incorporates many sources of data that previously existed in isolation on dedicated, customized systems (e.g., the cabin services system).

Figure 4A:
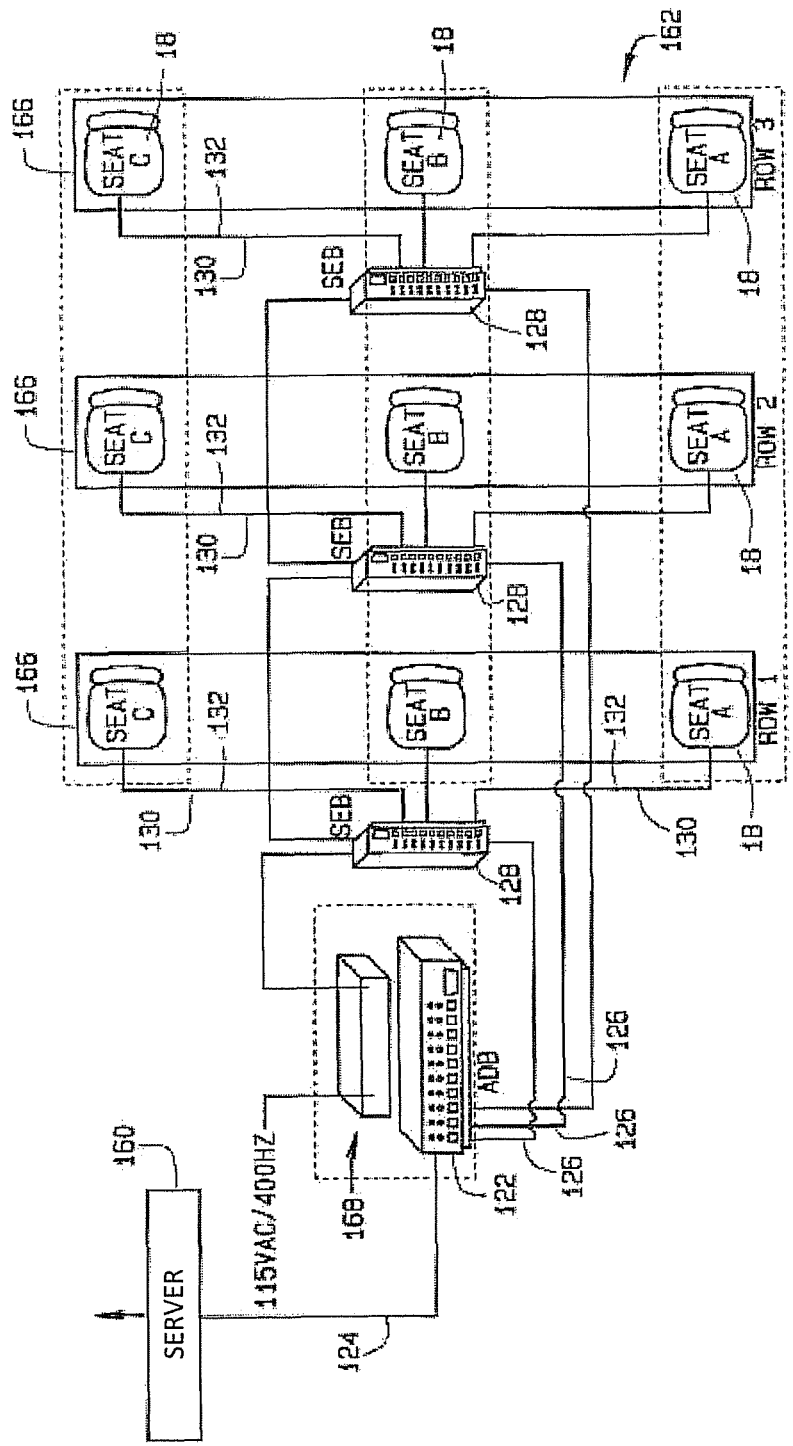
FIGS. 4A and 4B are top plan views of portions of another network in accordance with the present invention, where
Figure 4B:
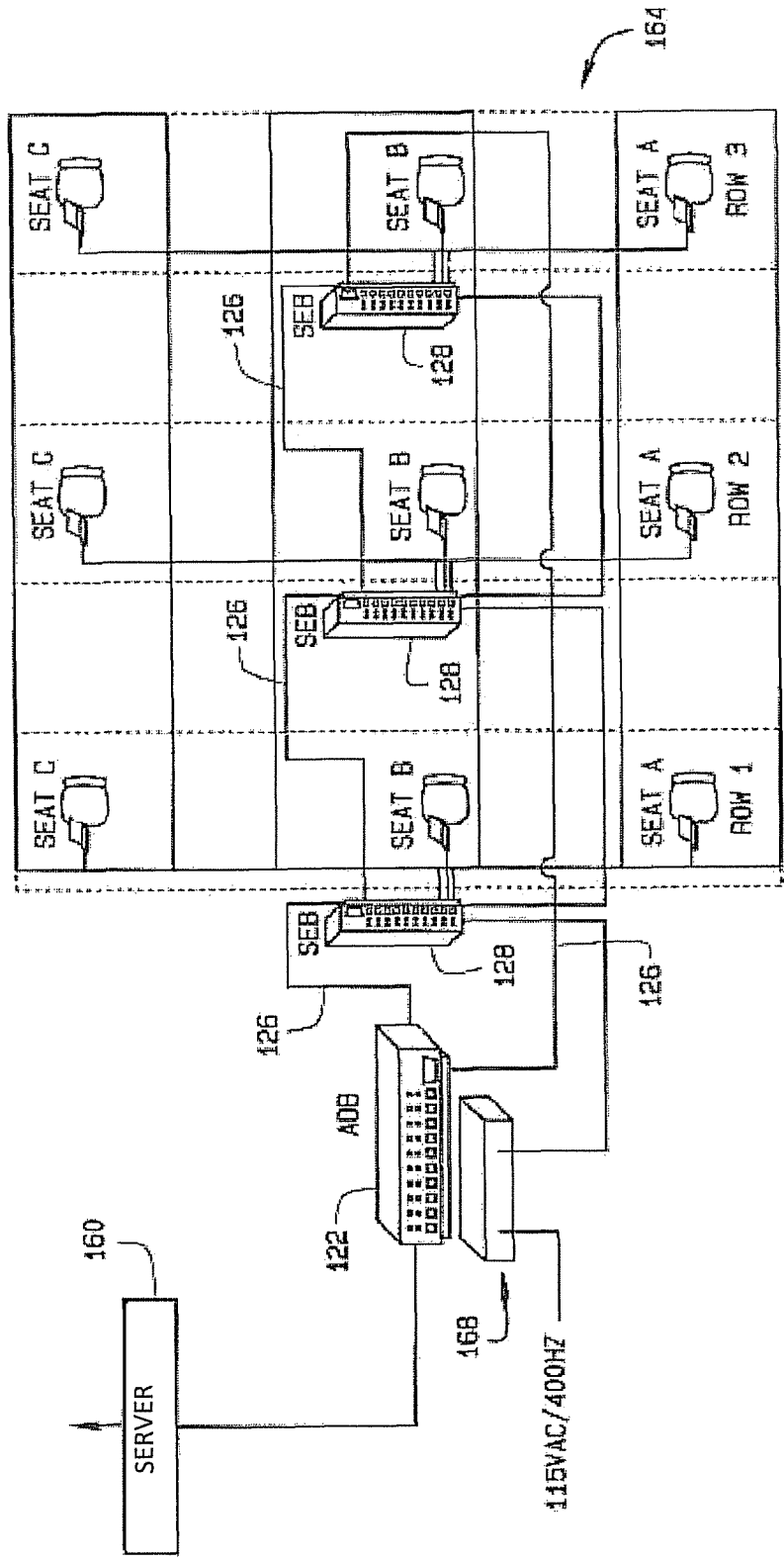

Turning now to the network connectivity at the seats 18, FIGS. 4A and 4B show two of the possible network topologies for the network 120. FIG. 4A shows a star topology while FIG. 4B shows a daisy topology. In particular, a server 160 (e.g., the Connexion By Boeing™ server 156, the cabin services interface 158, or the audio and visual on demand server 146, and the like) is shown providing content to the network 120. From the area distribution box 122, the network fans out to the seat electronics boxes 128 in the star topology 162 via fiber optic cables 126. Each seat electronics box 128, in turn, provides one, or more, communication paths 130 or 132 for connection of peripheral hosts or carryons at the seats 18. Note that the seat electronics boxes 128 may be associated with a particular row, or other grouping, of seats 166.

The star topology utilizes very lightweight (relative to copper) fiber interconnects. The distances of cable runs have very little effect on the system weight. This readily permits long distance "home run" interconnects from remotely located sources to individual seat groups, and minimizes the complexity, power, weight, and size of the seat electronics boxes cited in FIGS. 5A to 5C since each seat or seat group is connected directly to port on a centralized area distribution box.

FIG. 4A illustrates the network connected in a star topology 162 between the area distribution box (ADB) 122 and the seat electronics boxes 128. Each row of seats (or a portion thereof) may be a separate VLAN with access controlled at the ADB. Note that port protection may limit access between seats in a VLAN. FIG. 4B illustrates the network connected in a daisy topology 164 between the area distribution box (ADB) and a column of seat electronics boxes 128. Each column of seats may also be a separate VLAN with access controlled at the ADB. Port protection limits access between seats in a VLAN.

FIG. 4B shows the fiber optic cables 126 connected in a daisy chain topology 164 between the area distribution box 122 and the seat electronics boxes 128. In preferred embodiments, 100Base-FX fiber optic data links and cables 126 are used for the star topology of FIG. 4A while 1000Base-SX fiber optic data links and cables 126 are used for the daisy topology of FIG. 4B.

The daisy topology is useful to simplify network installation and to simplify seat reconfiguration and the re-pitching of seat distances by the airlines. Seat electronic boxes cited in FIGS. 5A to 5C with switches and media converters supporting 10/100 Mbps uplinks in a star topology are simpler, smaller, lower power, and less costly than other configurations of the seat electronic boxes. As switch technology and switch on chip technology evolves to better support 1 Gbps, the power, weight, and size difference between seat electronic boxes for the daisy and star topology is greatly reduced.

Additionally, both FIGS. 4A and 4B illustrate a power supply 168 for the network 120. Note also, that a preferred location for the seat electronics boxes 128 is under a seat 18 in, or adjacent to, the group of seats 18 that the seat electronics box 128 serves. Cables between the seat electronics boxes 128 and the seats 18, of course, may be routed in cable raceways, and along structures under or in the seats 18.

The seat electronics boxes 128 may be configured in many different ways to provide network connectivity for the peripheral hosts 134 and carry-ons 136 (see for example FIG. 2 or 3). FIG. 5 shows several exemplary configurations of the seat electronics units 128. In essence, FIGS. 5A, 5B, and 5C trade seat box size and complexity, number of user and peripheral host devices supported per seat group, with ADB size and complexity for networks implemented with star topologies. Fewer uplinks from SEBs to ADBs reduce the number of ADBs, but increase the complexity of the SEBs. Increasing the number of uplinks from SEBs to ADBs from one per seat group to one per seat increases the number of ADBs, but greatly simplifies the SEBs, despite increasing their number. These guidelines form the basis of designs for an optimum power, weight, and size open system network infrastructure for aircraft cabins.

Figure 5A:
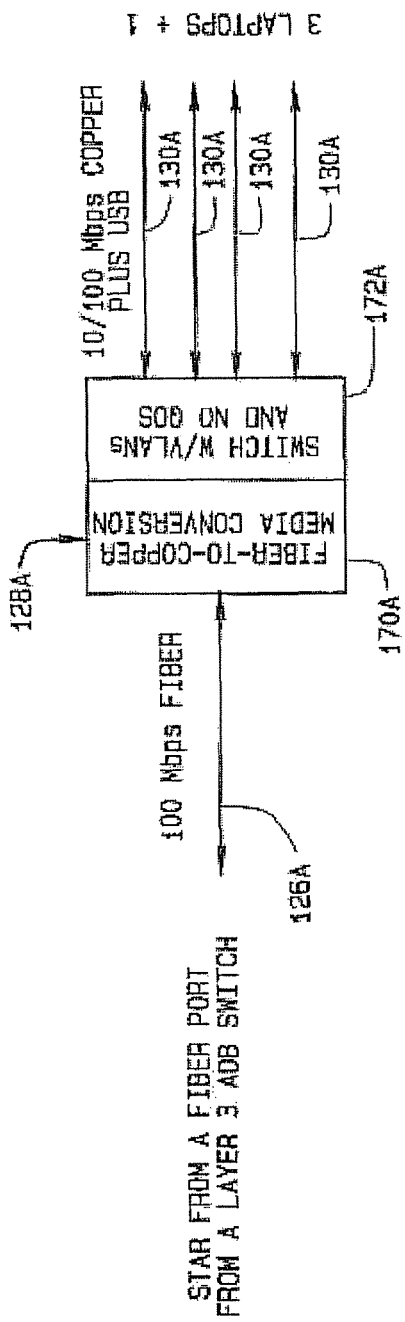
FIGS. 5A-5D are block diagrams of various configurations of seat electronics boxes of the networks of FIGS. 2 to 4.

For instance, FIG. 5A illustrates a seat electronics box 128A useful for connecting up to four peripheral hosts 134 (e.g. laptop computers or diskless terminal or disk based Tablet PCs used as seat back displays) to the network 120. Preferentially, the seat electronics box 128A connects to one duplex fiber cable 126A (preferably a 100 Mbps fiber data link) from the star network of FIG. 4A. Additionally, the seat electronics box 128A connects to four copper cables 130A (preferably 10/100 Mbps copper data links with a RJ-45 connector). In turn, the four cables 130A fan out to jacks on the seats either for connection by carry on peripheral hosts 134 or dedicated seat peripherals 136.

The seat electronics unit 128A includes one fiber optic to copper signal converter 170A (i.e. media converter) to convert the optic signal from the fiber cable 126A to an electromagnetic signal suitable for use with copper transmission paths (internally). Additionally, the seat electronics unit 128A includes one by four switch 172A to provide switched connectivity between the internal signal and the four cables 130A.

Figure 5B:
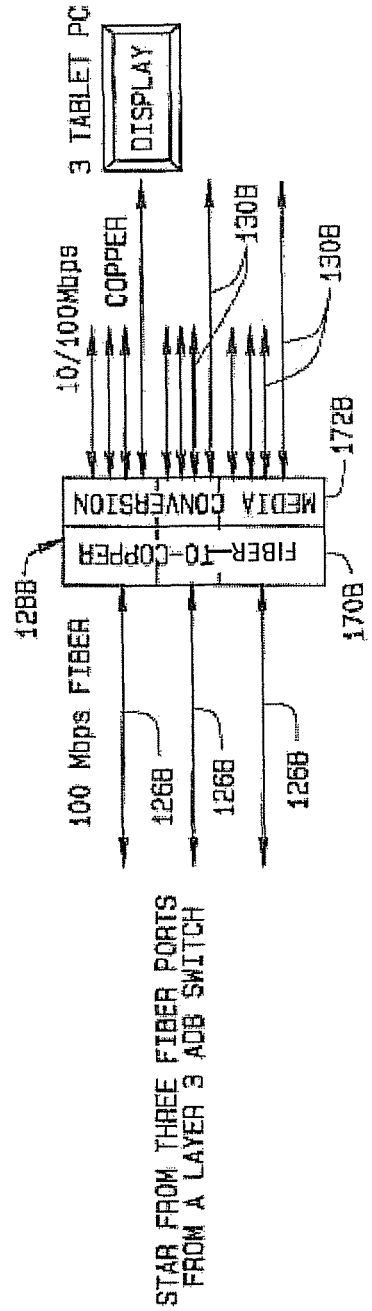

FIG. 5B illustrates a seat electronics box 128B with enhanced data connectivity. Notably, the seat electronics unit 128B provides connectivity between three fiber optic cables 126B (to one to three area distribution boxes 122B) and twelve copper cables 130B. Accordingly, the seat electronics box 128B includes three media converters 170B and three switches 172B. Since the switches 172B may be one by four switches (as in seat electronics boxes 128A), the switches 172B allow various connection configurations between the copper cables 130B and the fiber cables 126B. Thus, the seat electronics box 128B provides for virtual local area networks to the users at the seats 18.

Figure 5C:
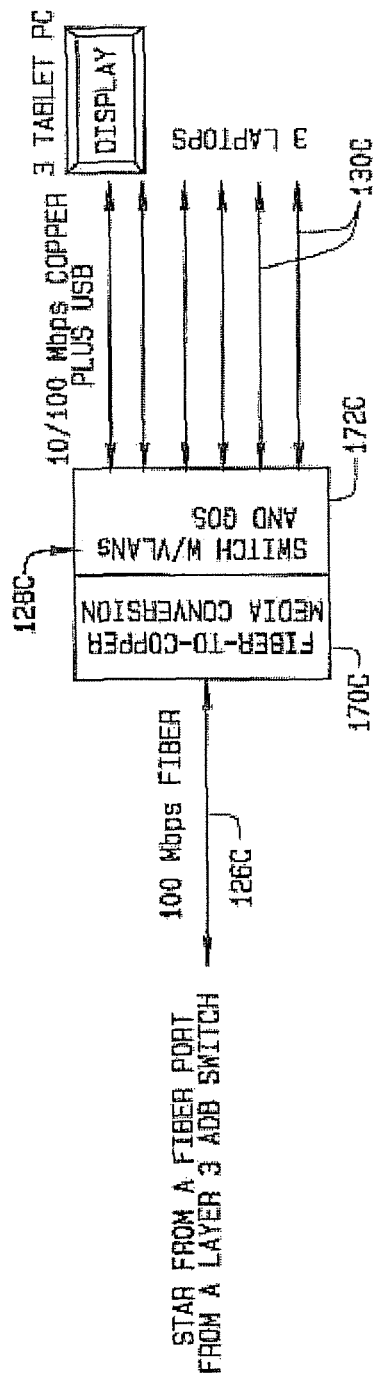

FIG. 5C shows another seat electronics box 128C in accordance with another embodiment of the present invention. Seat electronics box 128C provides connectivity between one fiber cable 126C and six (or eight) copper cables 130C. Accordingly, the seat electronics box 128C includes one media converter 170C and one by six (or eight, or greater) switch 172C. Accordingly, the seat electronics box 128C also provides for virtual local area networks within itself. Additionally, the seat electronics box 128C may provide quality of service management for the peripherals connected to it.

Figure 5D:
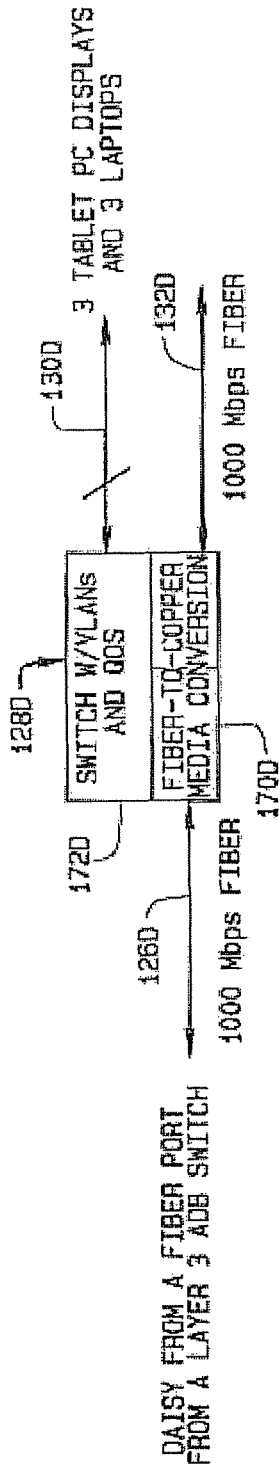

In another preferred embodiment shown in FIG. 5D, a seat electronics box 128D provides connectivity between one 1000 Mbps fiber cable 132D on one side and one 1000 Mbps fiber cable 126D connected on the other side in a daisy chain network topology to subsequent seat electronic boxes. Six (6) copper cables 130D provide 10/100 connectivity to peripherals in a seat group. Accordingly, the seat electronics box includes two media converters 170D and a multi-gigabit switch 172D to manage the conversion of the signals and connectivity for the peripherals 134 and 136. Accordingly, the seat electronics box 128D provides for virtual local area networks and quality of service management.

Turning now to the hardware preferred to create the star and daisy topologies as previously discussed, reference is now made to FIGS. 6A and 6B. The cabling approach illustrated provides identical cabling between the ADB and the floor breakout that is independent of seat wiring topology. The ADB can be designed to provide a high-density fiber wiring closet that will support either topology. In particular, FIG. 6A shows a portion of a star embodiment. From an area distribution box 222A, a 12-fiber (optic) ribbon cable 274A leads to a breakout box 276A. The breakout box 276A fans the ribbon cable 274A out to twelve simplex fibers 278A. Out to the ends of the simplex fibers 278A, the cables have been routed under the floor. However, duplex LC connectors 280A (one for each pair of simplex fibers 278A), at the floor interface 279A, allow a set of cables 282A to fan out in a star configuration. In turn, the cables 282A connect to the seat electronics boxes (e.g., by disconnects 284A) in a star configuration.

In comparison, FIG. 6B shows a portion of a daisy embodiment. From an area distribution box 222B, a 12-fiber (optic) ribbon cable 274B leads to a breakout box 276B. The breakout box 276B fans the ribbon cable 274B out to four simplex fibers 278B. Out to the ends of the simplex fibers 278B, the cables have been routed under the floor. However, duplex LC connectors 280B (one for each pair of simplex fibers 278B), at the floor interface 279B, allow a set of cables 282B to connect to the first and last seat electronics boxes (e.g., by disconnects 284A in a column in a daisy configuration.

Thus, the star topology of FIG. 6A contains six cables 282A at a floor interface 279A while the daisy topology of FIG. 6B contains two cables at a floor interface 279B. Accordingly, the floor interface 279A is more complex. Though it should be noted that the use of fiber connector arrays lessen the complexity of the floor interface 279A. Additionally, the daisy topology (FIG. 4B) has the advantage that a branched cable does not exist (and therefore requires little or no maintenance) in the relatively hard to access cable raceways under the seats of the aircraft. This is important in contrast to ground base, open networks that enjoy relatively easy access to all areas of the ground based network. Note should also be made that the ribbon cables used here include silicone rubber jackets to improve certain factors that are controlled onboard aircraft such as flammability, toxicity, and out gassing.

The use of the ribbon cables for the cables 274 minimizes the number of cables on the aircraft. Moreover, because the ribbon cables are robust, they are also generally used in harsh locations. Likewise, the ribbon cables are generally used for long distance runs within the aircraft (e.g. more than about 150 feet), particularly where accessibility may be time consuming. Thus, the ribbon cables lower installation and maintenance costs associated with the aircraft. Additionally, fiber optic jumpers are generally employed to complete the network connections between the floor interfaces 279 and the seat electronics boxes.

In another preferred embodiment, the present invention provides a switched, high bandwidth, open, Internet protocol based network that supports bandwidth intensive in flight entertainment services. These services include audio-video on demand (AVOD) as well as emerging Internet services enabled by broadband air-to-ground connectivity to the Internet.

The present embodiment includes a switched, high bandwidth, cabin network based on two-tier LAN architecture. The upper tier of the LAN may be based on OSI layer-3 switches. These switches may be mounted in centralized wiring closets on board the aircraft and may be referred to as area distribution boxes (ADBs). The ADBs may manage the network from a host with a browser including managing security (e.g., configuring routing between virtual LANs provided for the passengers via access lists). ADBs may also support managed quality of service for the entire system. Ports on these ADBs will also provide centralized access to satellite receiver/data routers, CoreNets, media servers, and wireless LAN access points.

At each group of seats (typically 2 or 3 seats in a row), the lower tier of the LAN may include OSI layer-2 LAN switches to provide the passengers with either a single, or multiple, switched port to access the network. The layer-2 switches, also known as Seat Electronics Boxes (SEBs) also provide the passengers with a VLAN per protected switch port to ensure security for the passenger and scalability of the system. It should be noted that when one port per passenger (or seat) is provided, the layer-2 switch could be dispensed with. However, in such embodiments the use of a level-2 switch is desirable to minimize the number of ports needed in the upper tier switches.

In embodiments providing two (or more) ports per passenger, though, a layer-2 switch may also be provided. Accordingly, one port may be allocated to supporting passenger peripherals (e.g., laptop personal computers, personal digital assistants, or passenger control units). Another port then may be allocated to a Tablet PC-like device that may serve as an intelligent seat back display.

The wiring between ADBs (are distribution boxes) may be low cost, duplex, high bandwidth (e.g., 1 Gbps) optical fiber links that have been certified for aircraft applications. In a preferred embodiment, 1000Base-SX data links and fiber cable is employed. For the interconnection between the ADBs and floor or sidewall disconnects, low cost duplex, high bandwidth optical fiber links may also be used. The cable runs may be terminated at the floor or sidewall disconnects by passive in-line connectors.

The use of fiber links offers several benefits over conventional twin axial and quad copper cables. First, these types of cables are limited to 100 Mbps bandwidth on aircraft due to electronic shielding requirements. The bandwidth-distance capabilities are higher for multimode optical fiber and many orders of magnitude higher for single mode optical fiber cable than copper cable. With suitable terminations, dual quad copper cable will support 1 Gbps once demonstrated for cabin service. Second, fiber provides a scalable interconnect that is still is very affordable relative to copper. Moreover, the conventional (copper) links require costly terminations and heavy shielding to meet aircraft cabin electronic shielding requirements. Since it does not require shielding and can be bundled in common jackets, fiber provides a link that, at most, weighs 1/10 the weight of a similar length (and less capable) conventional, copper-based link.

Additionally, the same type of optical links may be used to interconnect the SEBs in a daisy chain topology (or star or other network configurations) to support seat-to-seat cabling. Thus, each layer-2 switch (i.e., the seat electronics boxes), may support an uplink and a downlink port to adjacent SEBs in the daisy chain. Moreover, a return data link to an ADB may be provided to ensure that an Ethernet Spanning Tree Protocol (STP) can reconfigure the network to ensure continued interconnectivity among the remaining SEBs in the daisy chain if one SEB fails. Accordingly, the present embodiment also provides a fault tolerant, mobile platform network.

In yet another embodiment, the lightweight and capability to bundle multiple fibers in a single jacket also make it possible to provide a direct run uplink from every SEB to ports on the ADB. Moreover, because of the lightweight fiber link almost no weight penalty (relative to the daisy interconnect topology described above) occurs. Accordingly, the SEBs may be simplified in accordance with the present embodiment.

For the in-seat wiring, USB cables may be used to connect audio and voice peripherals to the SEBs. In the alternative, Bluetooth ports may be provided. Advantageously, using Bluetooth to connect the personal peripherals to hosts connected to the networked SEBs significantly simplifies, if not eliminates, the in-seat wiring. Thus, the weight and complexity of the aircraft seats may be reduced in accordance with the principles of the present embodiment.

In still other preferred embodiments, the seat electronics boxes may be connected to the area distribution boxes in either a star configuration or a daisy configuration as illustrated in FIG. 5C for a star topology and FIG. 5D for a daisy topology. Accordingly, the aircraft networks configured in a daisy topology in accordance with the principles of the present invention provide aircraft level weight savings (compared to an aircraft employing closed in flight entertainment, cabin services, and local area network subsystems) of approximately:

200 lbs for 150 seats;
360 lbs for 250 seats; and
570 lbs for 400 seats.

For aircraft networks configured in a daisy topology (compared to an aircraft employing future next generation closed in flight entertainment, cabin services, and local area network subsystems) the weight savings are approximately:

100 lbs for 150 seats;
190 lbs for 250 seats; and
300 lbs for 400 seats.

Likewise, the present invention provides a power savings (that translates to aircraft fuel requirements) with the daisy topology (compared to an aircraft employing closed in flight entertainment, cabin services, and local area network subsystems) of approximately:

2 KW for 150 seats;
3.5 KW for 250 seats; and
6 KW for 400 seats.

For the daisy topology, the corresponding power savings (compared to an aircraft employing future next generation closed in flight entertainment, cabin services, and local area network subsystems) are approximately:

0.6 KW for 150 seats;
0.8 KW for 250 seats; and
1.5 KW for 400 seats.

Figure 7:
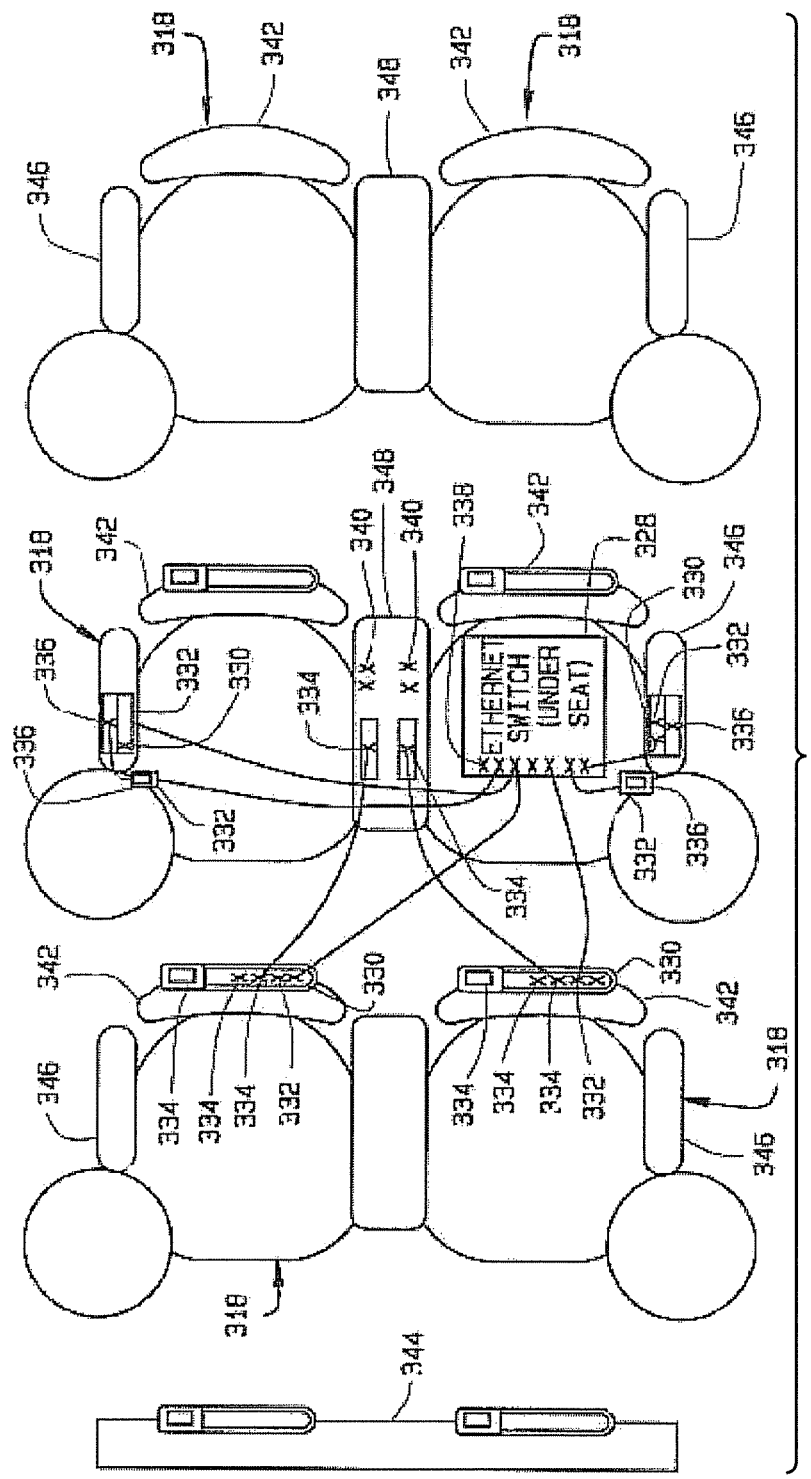
FIG. 7 is a schematic view of an aircraft seat in accordance with the principles of the present invention.

With reference now to FIG. 7, a typical group of seats 318 is illustrated. Under one or more of the seats 318 a seat electronics box 328 provides switched connectivity for the passengers in the seats 318, as described herein. In particular, power ports 330, 10/100 RJ-45 jacks 332 to peripheral hosts and carry-ons, USB jacks for audio and telephone headsets 334, USB jacks for network connectivity of carry-ons 336, fiber connectors 338, and 3.5 mm jacks 340 for conversion of analog headsets to digital USB by an embedded ND converter are illustrated. The variety of USB connections is provided by USB cabling from Tablet PCs mounted on the seat backs 342, on a bulkhead 344, to passengers through connectors on the armrests 346, and on consoles 348 between adjacent seats 318. Though, other locations for the connectors include, for example, under the seats 318 and on overhead control units.

Additionally, networks in accordance with the principles of the present invention are secure and scaleable to any size of aircraft or other mobile platform. Moreover, the present invention facilitates introduction of new services (e.g., single and multi-player on-line games) and will greatly reduce the weight and cost of cabling used in the cabin while providing superior EMI (Electro-Magnetic Interference) and ground loop resistance over that of the previously available, closed, proprietary systems.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A local area network (LAN) suitable for a mobile platform, the LAN comprising:
    at least one area distribution box (ADB) that performs open systems interconnections (OSI) layer-3 routing to provide access to the LAN, the at least one ADB further configured as at least one switch providing open OSI layer-2 connectivity to the LAN by a plurality of different subsystems of the platform using a common frequency band;
    a control panel residing within a crew information system and for controlling the LAN;
    a gateway subsystem interposed between the control panel and the at least one ADB for interfacing the crew information system of the mobile platform to the LAN, providing gateway and firewall services between the crew information system and the LAN, and enabling management of a flow of information over the LAN; and
    a plurality of seat electronics boxes (SEBs) in communication with the at least one ADB, each SEB configured to assign a respective virtual local area network (VLAN) of a plurality of VLANs to a respective protected OSI layer-2 port within a respective group of seats on the mobile platform corresponding to the SEB, and to provide quality of service (QoS) management for peripheral devices connected to a plurality of ports, inclusive of the protected OSI layer-2 port, in the corresponding group of seats,
    wherein the at least one ADB controls inter-VLAN routing between the plurality of VLANs through the use of one or more access lists.

2. The LAN according to claim 1, wherein the mobile platform comprises an aircraft.

3. The LAN according to claim 1, wherein the subsystems comprise an in-flight entertainment server and a gateway each configured to communicate with the at least one ADB.

4. The LAN according to claim 1, at least one of the SEBs comprising a layer-2 switch configured to provide a seat with a plurality of protected OSI layer-2 switch ports.

5. The LAN according to claim 1, wherein the subsystems comprise a satellite transceiver configured to communicate with the at least one ADB.

6. The LAN according to claim 1, wherein one of the SEBs further comprises at least one host device port for connecting a host device configured to communicate with any one of a plurality of peripheral devices when the host device is connected to the at least one ADB via the host device port, the host device associated with at least one seat on the mobile platform, and wherein one of the peripheral devices accesses at least one of information data, audio data and video data via the host device port.

7. The LAN according to claim 6, wherein each host device comprises application software installed on the respective host device, the application software on each of the host devices operating to access at least one of audio, video, information and telephone data.

8. The LAN according to claim 1, further comprising a wireless Bluetooth protocol communication link between the plurality of peripheral devices and the at least one of the host devices.

9. The network according to claim 1, wherein at least one of the host devices further comprises a virtual local area network, and wherein the host device controls the security and the quality of service of the network for the peripheral devices.

10. The LAN according to claim 1, further comprising a duplex or ribbon fiber cable between the plurality of SEBs and one of the at least one ADB to allow communication therebetween.

11. The LAN of claim 1, wherein a first VLAN is assigned to the respective protected OSI layer-2 port for a first group of seats on the mobile platform, wherein a second VLAN is assigned to the respective protected OSI layer-2 port for a second group of seats on the mobile platform, and wherein the first VLAN is distinct from the second VLAN.

12. The LAN of claim 11, wherein the mobile platform comprises a plurality of groups of seats, inclusive of the first group of seats and the second group of seats, wherein each seat within each of the plurality of groups of seats comprises a respective protected OSI layer-2 port, and wherein plurality of SEBs are configured to assign a unique VLAN to each of the protected OSI layer-2 ports for each seat within each of the plurality of groups of seats.

13. A mobile platform comprising:
    a local area network (LAN) including a plurality of different subsystems of the platform;
    at least one area distribution box (ADB) of the LAN that performs open systems interconnections (OSI) layer-3 routing to provide access to the LAN, the at least one ADB further configured to provide OSI layer-2 connectivity to all of the subsystems using a common base bandwidth;
    a control panel residing within a crew information system and for controlling the LAN;
    a gateway subsystem interposed between the control panel and the at least one ADB for interfacing the crew information system of the mobile platform to the LAN, providing gateway and firewall services between the crew information system and the LAN, and enabling management of a flow of information over the LAN;
    a plurality of seat electronics boxes (SEBs) in communication with the at least one ADB, each SEB configured to assign a respective virtual local area network (VLAN) of a plurality of VLANs to a respective protected OSI layer-2 port within a respective group of seats on the mobile platform corresponding to the SEB, and to provide quality of service (QoS) management for peripheral devices connected to a plurality of ports, inclusive of the protected OSI layer-2 port, in the corresponding group of seats,
    wherein the at least one ADB controls inter-VLAN routing between the plurality of VLANs through the use of one or more access lists.

14. The mobile platform according to claim 13, wherein the mobile platform comprises an aircraft.

15. The mobile platform according to claim 13, wherein the subsystems comprise an in-flight entertainment server configured to communicate with the at least one ADB.

16. The mobile platform according to claim 13, wherein the subsystems comprise a satellite transceiver configured to communicate with the at least one ADB.

17. The mobile platform according to claim 13, wherein each SEB further comprises at least one port for a host device, each host device enabling any one of a plurality of peripheral devices to communicate with the respective host device when the respective host device is connected to one of the ADBs via the port, wherein the each host device is associated with at least one seat on the mobile platform and wherein one of the peripheral devices accesses the flow of information, and wherein the flow of information includes at least one of information data, audio data and video data via the host device port.

18. The mobile platform according to claim 17, further comprising a Bluetooth protocol communication wireless link between the plurality of peripheral devices and the at least one of the host devices.

19. The mobile platform according to claim 13, wherein the flow of information over the LAN includes information data, audio data, video data, and telephone data in the common base bandwidth.

20. The mobile platform according to claim 13, wherein at least one of the host devices further comprises a virtual local area network, the host device controlling the security and the quality of service of the network for the peripheral devices.

21. The mobile platform according to claim 13, further comprising a duplex or a ribbon fiber cable between the plurality of SEBs and the ADB to allow communication therebetween.

22. A method of distributing information on a mobile platform, comprising:
providing access by a plurality of different subsystems of the platform to a local area network (LAN) including at least one area distribution box (ADB) on the platform, the ADB configured to perform open systems interconnections (OSI) layer-3 routing to provide access to the LAN, the at least one ADB further configured as at least one switch providing open OSI layer-2 connectivity to the LAN by the subsystems using a common frequency band;
using a control panel residing within a crew information system for controlling the LAN;
using a gateway subsystem interposed between the control panel and the at least one ADB for interfacing the crew information system of the mobile platform to the LAN, providing gateway and firewall services between the crew information system and the LAN, and enabling management of a flow of information over the LAN;
connecting a plurality of seat electronics boxes (SEBs) with the at least one ADB in the LAN;
configuring, for each of the plurality of SEBs, a respective virtual local area network (VLAN) of a plurality of VLANs mapped to a respective protected OSI layer-2 port within a respective group of seats corresponding to the SEB and to provide quality of service (QoS) management for peripheral devices connected to a plurality of ports, inclusive of the protected OSI layer-2 port, in the corresponding group of seats; and
controlling, at the at least one ADB, inter-VLAN routing between the plurality of VLANs through the use of one or more access lists.

* * * * *